UNITED STATES PATENT OFFICE.

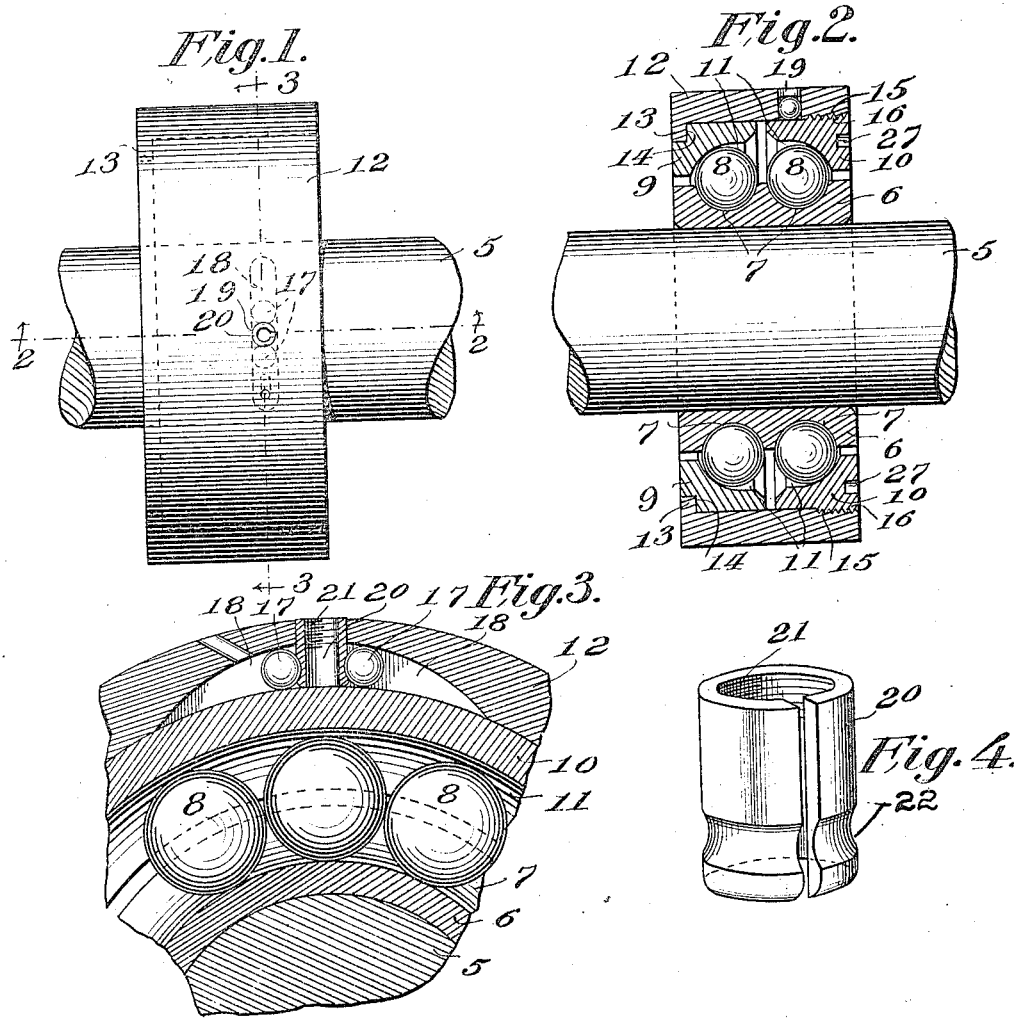

GEORGE O'LOUGHLIN, OF WATERBURY, CONNECTICUT, ASSIGNOR OF ONE-HALF TO LAWRENCE J. TOBIN, OF WATERBURY, CONNECTICUT.

BALL-BEARING.

1,045,736.  Specification of Letters Patent.  Patented Nov. 26, 1912.

Application filed February 8, 1911. Serial No. 607,318.

*To all whom it may concern:*

Be it known that I, GEORGE O'LOUGHLIN, a citizen of the United States, residing at Waterbury, in the county of New Haven and State of Connecticut, have invented new and useful Improvements in Ball-Bearings, of which the following is a specification.

The invention relates to a ball bearing, and more particularly to the class of adjustable ball bearings.

The primary object of the invention is the provision of a bearing in which the ball cone may be adjusted, so as to compensate for wear, and that will be sustained in adjusted position, thus preventing derangement of the adjunct parts of the bearing.

Another object of the invention is the provision of a ball bearing in which the balls are retained in raceways provided in a sleeve and retaining cones, the cones being adjustable upon the sleeve and are held against movement relatively to the said sleeve by means of a locking device, so that the cones will be sustained in adjusted position on the sleeve.

A further object of the invention is the provision of a ball bearing which is simple of construction, readily and easily cleaned, and that is thoroughly reliable and efficient in operation, and inexpensive in production.

With these and other objects in view, the invention consists of the construction, combination and arrangement of parts, as will be hereinafter more fully described, illustrated in the accompanying drawings, and pointed out in the appended claims.

In the drawings: Figure 1 is a top plan view of a ball bearing constructed in accordance with the invention. Fig. 2 is a transverse sectional view on the line 2—2 of Fig. 1. Fig. 3 is a fragmentary vertical sectional view on the line 3—3 of Fig. 1. Fig. 4 is a detail perspective view of a split plug member removed from the bearing.

Similar reference characters indicate corresponding parts throughout the several views of the drawings.

Referring to the drawings by numerals, 5 designates a rotary shaft, upon which is fixed the ball bearing, comprising a sleeve or collar 6, the latter being suitably fixed to the shaft, so as to rotate therewith, and formed in the outer peripheral surface of the sleeve or collar 6 are spaced ball raceways 7, in which are arranged independent series of bearing balls 8, the same being retained in the raceways by means of cones 9 and 10, respectively, the latter cone 10 being adjustable and both of which are formed with annular raceways 11 receiving the anti-frictional bearing balls 8, the cones being arranged concentrically about the sleeve or collar 6, and are held within the casing or shell 12 in a manner as will be hereinafter more fully described. This shell or casing 12 is preferably of cylindrical shape and is formed at one end edge with an inturned annular flange 13, the latter engaging a circular groove or bearing seat 14 formed in the outer face of the cone 9 at the outer peripheral edge thereof. The opposite end edge of the casing or shell 12 is formed with internal threads 15, the same being engaged by complementary external threads 16 provided on the cone 10 at the outer peripheral edge thereof, whereby the said cone may be adjusted in the shell for the tightening of the bearing balls or the loosening of the same in the raceways, as the occasion requires.

The cone 10 is held locked in the sleeve by means of a locking device, comprising a pair of locking balls 17, the latter being disposed in an arcuate-shaped cam slot or groove 18 formed in the inner face of the shell or casing 12, so that the balls 17 will contact with the outer peripheral surface of the cone 10, the said groove or slot 18 being so constructed as to have its bottom wall or bed outwardly tapered toward opposite ends, whereby the balls 17, when moved therein, will become wedged between the bottom or bed of the groove, and the outer peripheral surface of the cone 10, so as to lock the latter against rotation, thereby obviating the possibility of the binding of the bearing balls between the cone, or the loosening of the said cone 10 after the same has been adjusted.

Provided in the shell or casing 12 and intersecting the cam groove or slot 18 is an aperture 19, the latter detachably receiving a split tubular spring plug 20, the same being formed at its outer end with internal threads 21 to be engaged by any suitable threaded tool, whereby the plug may be readily removed from the aperture when desired. Spaced from the inner end of the plug 20 in the outer face thereof, is formed an annular channel 22, in which are adapted to be seated the locking balls 17 on the insertion of the plug 20 into the aperture 19, so as to protrude within the cam slot or groove 18, the plug 20 being designed to separate the locking balls 17, so as to cause the binding thereof between the bed of the cam slot and the outer peripheral surface of the cone 10, thus locking it, so that the same may be held fast in adjusted position.

What is claimed is:

1. A ball bearing consisting of a sleeve having a raceway, a cone surrounding said sleeve and having a registering raceway, a casing surrounding said cone and provided with an opening, and a cam groove communicating with said opening, a split tube movable in the opening and having its inner end formed with a circumscribing groove, balls disposed in the cam groove and adapted to be forced into locking position therein to bind against the cone by said split tube and balls disposed in the raceways.

2. A ball bearing consisting of a sleeve having spaced raceways, a casing surrounding the sleeve and provided with a stop in one end, a cone adapted to engage said stop and provided with a raceway registering with one of the sleeve raceways, a second cone having a raceway registering with the other sleeve raceway, said casing being provided with an opening and a cam groove communicating with said opening, locking balls disposed in said cam groove and adapted to bind against the second cone, and a split tube disposed in said opening and holding said balls in a locking position.

In testimony whereof I affix my signature in presence of two witnesses.

GEORGE O'LOUGHLIN.

Witnesses:
 MARY SLAVIN,
 D. J. SLAVIN.